(12) United States Patent
Geertsen

(10) Patent No.: US 8,734,056 B2
(45) Date of Patent: May 27, 2014

(54) UNDERWATER HYDROCARBON TRANSPORT AND TEMPERATURE CONTROL DEVICE

(75) Inventor: Christian Geertsen, Versailles (FR)

(73) Assignee: ITP SA, Louveciennes (FR)

( * ) Notice: Subject to any disclaimer, the term of this patent is extended or adjusted under 35 U.S.C. 154(b) by 255 days.

(21) Appl. No.: 13/465,611

(22) Filed: May 7, 2012

(65) Prior Publication Data

US 2012/0298216 A1 Nov. 29, 2012

(30) Foreign Application Priority Data

May 23, 2011 (FR) ...................................... 11 01577

(51) Int. Cl.
*F16L 59/00* (2006.01)
(52) U.S. Cl.
USPC .......................................... 405/210; 137/340
(58) Field of Classification Search
USPC .......................................... 405/210; 137/340
See application file for complete search history.

(56) References Cited

U.S. PATENT DOCUMENTS 6,427,717 B1 8/2002 Kimura

FOREIGN PATENT DOCUMENTS

WO WO 03/102357 A1 12/2003

OTHER PUBLICATIONS

Jan. 12, 2012 Search Report issued in French Patent Application No. 11.01577 (with translation).

*Primary Examiner* — Tara M. Pinnock
(74) *Attorney, Agent, or Firm* — Oliff PLC

(57) ABSTRACT

The invention relates to a hydrocarbon transport device intended to be immersed and arranged at an extraction wellhead, comprising a first pipe through which a first fluid leaving the extraction well flows, the first pipe being arranged in an external protective casing, a piloting system to pilot the temperature in the first pipe controlling an activation element of a regulating system for regulating a heat exchange between the first pipe and the liquid medium filling the immersed external casing, the regulating system comprising at least a second pipe arranged around the first pipe and delimiting an annular space enclosing at least one regulating fluid, this regulating fluid being injected into or expelled from the annular space by the activation element of the regulating system.

19 Claims, 12 Drawing Sheets

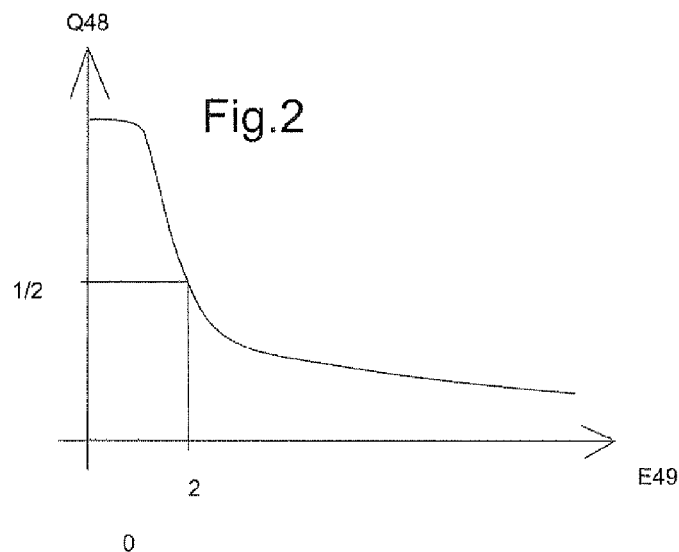
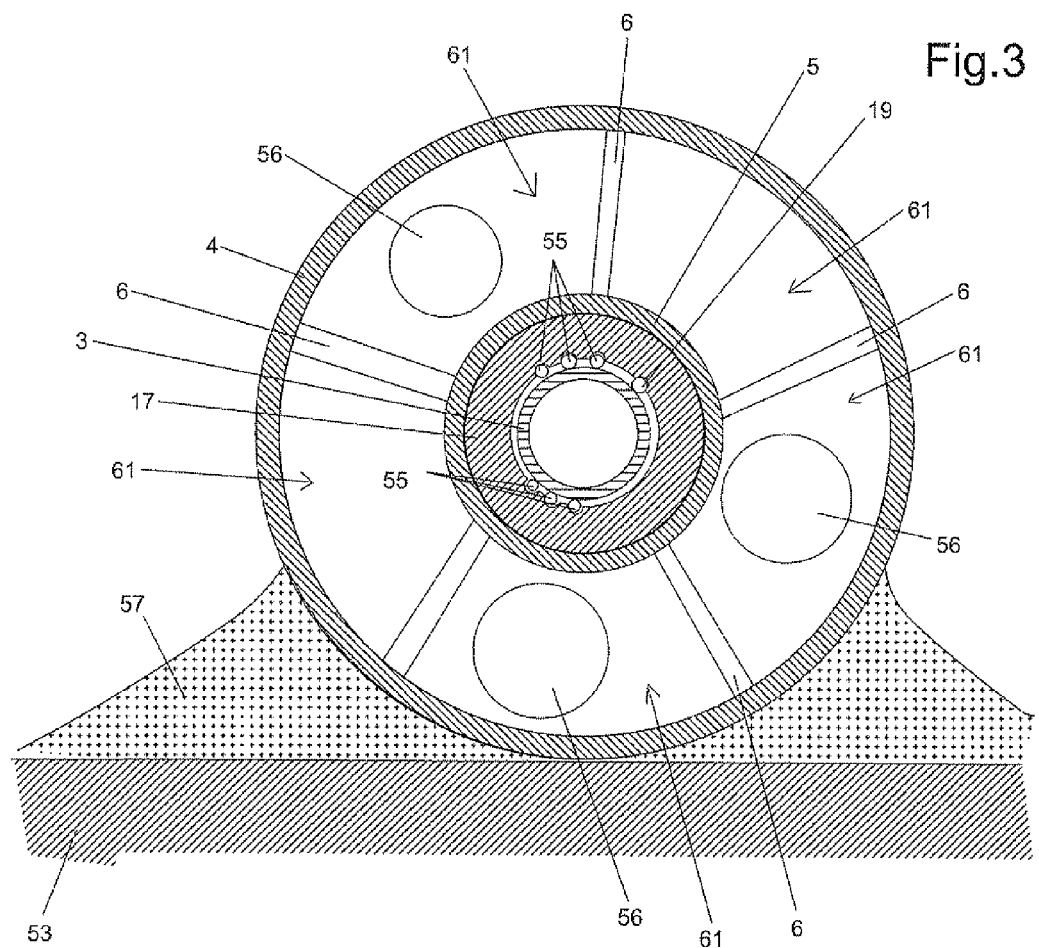

UNDERWATER HYDROCARBON TRANSPORT AND TEMPERATURE CONTROL DEVICE

BACKGROUND OF THE INVENTION

1. Field of the Invention

The technical scope of the present invention is that of hydrocarbon transport pipes able to regulate the temperature of the hydrocarbons.

2. Description of Related Art

To prepare for the depletion of subsea oil fields at low and medium temperature, which is to say at a temperature of less than 120° C., oil producers are obliged to exploit the deep geological layers of the subsea oil reserves, for example at depths of around 4000 or 6000 meters, or even deeper. Because of a mean geothermal gradient of 30° C./km, the hydrocarbons leaving the oil wells can reach temperatures of over 150° C. The temperatures observed can be, for example 210° C. or even 240° C. at the wellhead.

One technical problem is thus to provide installations adapted to these temperatures, both to support the thermal expansion by resisting to the stresses or by authorizing and controlling them, and to select materials adapted to these temperatures. Mechanical structures such as expansion loops, for example, enable substantial expansion, and mitigate the phenomenon of buckling of hydrocarbon pipelines. Another solution is disclosed in patent application GB-2188394 which describes a helical structure enabling the expansion of the pipelines. These approaches are not economically viable in the case of pipelines of several kilometers or several tens of kilometers in length and for which free expansion can reach several meters per kilometer.

In addition to the constraints depending on the dimensional variations, the constitutive metallic material of the pipeline has a maximum yield strength that corresponds to an acceptable maximum stress and that reduces as the temperature increases. The acceptable maximum stress is reduced, for example, by 75 MPa for carbon steel exposed to 200° C. and by 140 MPa for duplex steel, which is appreciable given a maximum elasticity of around 400 or 450 MPa at ambient temperature.

In the event of completely restrained thermal expansion, the stresses due to temperature changes increase by more than 2 MPa/° C. and it has been observed that high temperatures can lead to substantial increases in the thickness of the pipe walls to allow them to withstand the internal pressures. Restraining the thermal expansion thus results in additional force exerted on the pipeline.

There is, therefore, a strong need to reduce the temperature of hydrocarbon transport pipelines. This need for cooling is all the more important at the wellhead where the temperatures are the highest.

Even downstream of the well outlet, after part of the heat has dissipated, high temperatures can remain and cause technical problems. Chemical products injected into the wellstream namely have maximal operating temperatures. Thus, an anti-corrosion product is inoperative at above 100° C., for example. Electronic components may also be damaged or destroyed at temperatures above their maximum operating temperature.

Lowering the temperature thus enables the installations to operate more efficiently from a mechanical point of view but also enables chemical additives or electronic equipment to be used the closest from the well outlet.

A solution that is sometimes implemented consists in installing a portion of non-insulated piping at the well outlet to facilitate cooling. The length of such piping rarely exceeds a few tens of meters, that only enables marginal cooling of 10 to 20° C. when the oil well is in maximum production. Moreover, such a solution is not satisfactory for production stoppages involving a risk of forming plugs of hydrocarbons in the non-insulated part. Indeed, the temperature of the effluent cannot be allowed decrease to the temperature of the sea environment, typically 4° C., since this could lead to the formation of gas hydrates and other solids which could block the hydrocarbon pipeline.

Another issue is the variation of pressure and temperature at the well head as the oil reservoir is being exploited. Initially, the wellhead will be exposed to high temperature and pressure. This will require substantial cooling at the beginning of exploitation and less cooling, or even no cooling at all, at the end of exploitation.

There is thus a need for the temperature to be regulated in the hydrocarbon transport pipeline.

A subsea installation must furthermore meet the requirements of simplicity and robustness.

SUMMARY OF THE INVENTION

The aim of the present invention is to overcome the drawbacks of prior art by supplying a hydrocarbon transport device intended to be immersed and arranged at an extraction wellhead, able to adapt both to the high temperatures in the early phases of production and to lower temperatures at the later production phases, or the production turndowns or stoppages.

This objective is reached thanks to a hydrocarbon transport device intended to be immersed and arranged at the head of an extraction well, comprising a first pipe through which a first fluid leaving the extraction well flows, the first pipe being arranged in an external protective casing which is, furthermore, filled with a liquid medium when the device is immersed and installed at the head of the well, further comprising a piloting system to pilot the temperature of the hydrocarbons circulating in the first pipe, that controls at least one activation element of a regulating system to regulate heat exchange between the first pipe and the liquid medium filling the external casing, the regulating system comprising at least a second pipe arranged around the first pipe delimiting an annular space enclosing at least one regulating fluid, this regulating fluid being injected into or expelled from the annular space by the activation element of the regulating system.

According to another particularity of the invention, the transport device comprises a heating system for heating the first pipe, the heating system being controlled, activated or deactivated by the piloting system.

According to another particularity of the invention, the piloting system controls an activation of the heating system while the regulating system controls a reduction of the heat exchanges. It's namely a reduction in the heat flow from the first pipe to the medium filling the protective casing then towards the surrounding medium around the protective casing.

According to another particularity of the invention, the piloting system controls a deactivation of the heating system while the regulating system controls an increase of the heat exchanges.

According to another particularity of the invention, the transport device comprises at least one temperature sensor transmitting, via a communication link, a signal representative of the temperature of the fluid coming out of the extraction well to the piloting system, a calculator of the piloting system making at least one comparison with a memorized threshold value, according to which heating or cooling is ordered by the piloting system.

According to another particularity of the invention, the temperature sensor comprises at least one optical fiber arranged in the annular space delimited between the first and second pipes and along the first pipe.

According to another particularity of the invention, an insulating material is arranged in the annular space between the first and second pipes, the regulating fluid being gaseous, the regulating system comprising a gas transport duct leading to an orifice of the closed annular space arranged between the first and second pipes, the suction of gas in or out of this annular space being activated by said activation element, the insulating material having a variable insulating capacity depending on the pressure inside the annular space, the thermal conductivity of the insulating material expressed in W/(m·K) being able to vary by a factor of at least 3 between 10 mbar and 1 bar and by a factor of at least 4 between 1 bar and 60 bar.

According to another particularity of the invention, the piloting system comprises, in addition, a control module for controlling a supply selection valve for selecting a type of gas to be injected.

According to another particularity of the invention, the selection valve controls the supply to said activation element by a supply pipe transporting a first gas, such as air or xenon, or by a second supply pipe transporting a second gas, such as helium.

According to another particularity of the invention, said activation element comprises a pump to create a vacuum by suction or said activation element comprises a valve communicating with a vacuum tank to create a vacuum.

According to another particularity of the invention, the piloting system comprises a control interface arranged on surface service equipment, the piloting system comprising, in addition, an immersed vehicle remotely controlled by the control interface and powered, the vehicle comprising mobility and orientation equipment and being equipped with an linking element to link it to a connecting element in communication with the annular space delimited between the first and second pipes, the immersed vehicle being equipped with a positioning element for a positioning with respect to the external protective casing.

According to another particularity of the invention, said activation element of the regulating system is embedded in the vehicle, the vehicle comprising at least one gas tank communicating, via said activation element, with the linking element.

According to another particularity of the invention, the piloting system comprises a control interface arranged on surface service equipment, the piloting system comprising, in addition, an embedded module integrated into an extremity structure at the inlet or outlet to the transport device, the embedded module being able to be controlled remotely by the control interface and being powered, the embedded module comprising a linking element to link it to a connecting element in communication with the annular space delimited between the first and second pipes, the embedded module being equipped with said activation element of the regulating system and comprising at least one gas tank communicating, via said activation, element, with the linking element.

According to another particularity of the invention, said activation element being a pump, the regulating fluid is in the form of a cooling liquid circulating in the annular space under the action of the pump and moving from an inlet orifice to an outlet orifice to then move into the medium filling the external casing.

According to another particularity of the invention, the regulating system comprises a closed circuit made by at least one duct passing inside the external casing via which said outlet orifice communicates with said inlet orifice.

According to another particularity of the invention, the regulating system comprises a thermally insulating material arranged around the second pipe.

According to another particularity of the invention, the transport device comprises a third pipe arranged around and at a distance from the second pipe, forming another additional annular space in which said thermally insulating material is placed, the regulating system controlling a pressure inside the annular space between the second and third pipes by a suction of gas in or out of this closed annular space that is provided with a communication orifice that communicates with a mechanism to inject gas in or expel it.

According to another particularity of the invention, the transport device is of the type that is built on land and forms a single assembly several kilometers long, this assembly being made so as to be towed out to sea before being immersed during its installation. Such an assembly is also called a "bundle".

A first advantage lies in that the hydrocarbon transport device enables the temperature of the effluent to be significantly lowered, namely by 30, 50 or 100° C., and is thus able to be installed between the wellhead and a more classical pipe, designed to carry fluid at lower temperatures.

Another advantage of the present invention lies in that a high thermal power of around 1 MW to 50 MW can be dissipated by a simple and robust device.

Another advantage of the present invention lies in the fact that, during production stoppages, the hydrocarbon transport device positioned at the wellhead can be kept at temperatures enabling production to be started up again.

Another advantage of the present invention lies in that the transport device position at the well outlet constitutes a heat dissipating system that can withstand particularly well any fouling of the exchange surfaces since it uses a large area of piping to perform the heat exchanges. The transport device made in the form of a single assembly, called "bundle", intended to be towed out to sea for its installation, may, for example, be several kilometers in length, typically 8 km, but even up to several tens of kilometers.

BRIEF DESCRIPTION OF THE DRAWINGS

FIG. 2 schematically shows a drop in the energy produced by a well during the exploitation of a petroleum reservoir;

FIG. 3 shows a cross section of a transport device according to the invention;

DETAILED DESCRIPTION OF PREFERRED EMBODIMENTS

Figure 1:
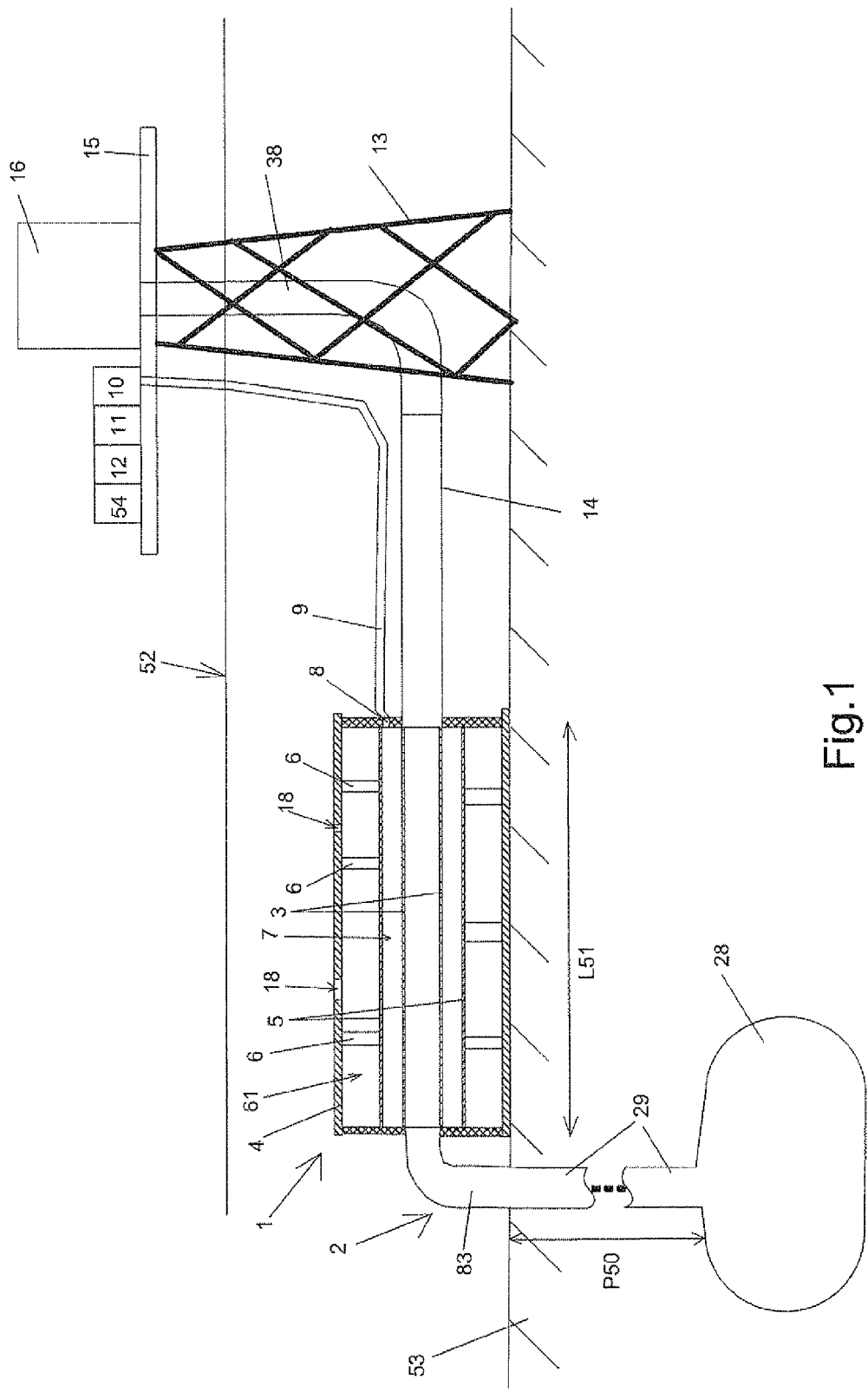
FIG. 1 show a well connected to a transport device according to the invention, itself linked to a production facility.

FIG. 1 shows an immersed hydrocarbon transport device 1 arranged at the head of an extraction well 2. A deep pool of hydrocarbons is schematized by a pocket 28 to which access is made by a drill 29. The drill 29 is linked under water to the well head 2. The pool of hydrocarbons lies at a depth P50 of, for example, between 4000 and 8000 meters, or more. A well outlet pipe 83 links the drill 29 to the transport device 1. This pipe 83 is a classical pipe that does not, in itself, cause any significant change in temperature.

The transport device 1 according to the invention comprises a first pipe 3 into which the fluid arrives from the extraction well 2. A second pipe 5 is arranged around and at a distance from the first pipe 3. The first and second pipes 3 and 5 are held in relation to one another by assembly elements and form a pipe-in-pipe. An annular space 7 is arranged between these two pipes 3 and 5.

The pipe-in-pipe is arranged in an external protective casing 4. In FIG. 1, schematized elements 6 hold the protective casing 4 with respect to the external pipe 5. The holding elements 6 comprise, for example, spacers and metal collars, or other fastening or hooking elements to hold the various elements for assembling in their relative positions. Openings 18 are made in the external protective casing 4 so as to allow the external protective casing 4 to be filled when immersed to be placed in its final position at the well outlet.

To implement the transport device 1 according to the invention, it is built on land and then towed by ship, where it floats on the surface 52 of the water or below the surface, thanks to the buoyancy control provided by the inner volume of the tubular casing 4, filled with air or nitrogen. When the device 1 to be installed at the wellhead 2 reaches the installation site, the device 1 is immersed by filling the external protective casing 4 with water. The filling is performed by opening the openings 18. The transport device 1 arranged at the wellhead 2 then lies on the seabed 53.

Openings 18 may remain open to allow the water to circulate freely through, or may be closed, the non-circulating of water does not prevent the thermal exchanges between the inside of the casing 4 and its surrounding external environment. The external protective casing 4 is not thermally insulated. The casing 4, made of metal for example, naturally conducts the heat.

The annular space 7 formed by the first and second pipes 3 and 5 is closed and communicates with an orifice 8 to inject or expel a fluid that is, for example, a gas. Thus, the gas pressure inside the annular space 7 can be increased or reduced. The temperature regulating fluid injected into or expelled from of the annular space may be a gas, as previously described, or a liquid, as will be described later.

The regulating system increases or reduces the thermal exchanges between the first pipe 3 and the medium 61 filling the external casing, this medium being, for example, seawater.

A suction in or out is activated by a temperature piloting system that controls the increase or reduction of the gas pressure inside the annular space 7. The temperature piloting system may also control the maintaining of the pressure at a predetermined value in the annular space 7.

The temperature piloting system controls an activation element of the regulating system, this activation element being, for example, a pump 10, and comprising an electrical module 11 and an electronic control module 12. The pump is controlled, for example, by the electrical power module 11. The electrical power module 11 receives the commands from the electronic control module 12. This electronic control module 12 is, for example, controlled by a management module 54 that will be described in more detail later.

The activation element of the regulating system may be a pump or valve as will be described hereafter.

A pump 10 equipped with a heat engine or an electrically-powered engine may be used.

The activation element of the regulating system may also be controlled manually.

The temperature piloting system comprises a pressure sensor 78 with respect to which the gas pressure in the annular space 7 may be regulated. The pressure sensor is, for example, integrated into the pump or arranged in a gas supply duct of the transport device 1 according to the invention.

A suction pump 10 to draw the gas in or out with a determined suction capacity according to the volume of the annular space 7, into or from which this gas is injected or expelled, may be selected. The pump 10 may, in this case, be turned off or turned on for maximum discharge or for maximum suction, depending on a measured temperature. Different suction or discharge levels may also be set by the operator. A low pressure may, for example, be set at 48 mbar or even 2 mbar and a high pressure at 1 bar or even 100 bar. This setting may be made automatically or manually.

The pressure sensor 78, for example, supplies a signal representative of the gas pressure inside the annular space 7 to a management module managing an indicator dial. A user may then manually activate the pump while checking the indicator dial. The indication given by the dial is, for example, a pressure or indication of the pipe-in-pipe cooling rate.

The control of the activation element of the regulating system may also be rendered automatic.

The increase of the gas pressure in the annular space 7 corresponds to an increase of the heat dissipated by the pipe-in-pipe towards the interior of the protective casing 4 then to the exterior of the protective casing 4. A reduction of the gas pressure in the annular space 7 corresponds to a reduction of the heat dissipated by the pipe-in-pipe inside the external protective casing 4.

Thus, the dissipation of heat may be regulated according to need. The heat of the fluid leaving the well namely depends on the reservoir depth P50. The typical increase in reservoir temperature is around 30° C. per kilometer.

The hydrocarbon transport device 1 arranged at the wellhead 2 is of a predetermined length L51. This length L51 partly determines its cooling capacity. The length L51 of the hydrocarbon transport device 1 is, for example, between 0.5 km and 20 km.

A long enough length will, when the heat-dissipating capacity is set at the maximum by the temperature piloting system, enable a maximum dissipation of heat and thus allow the fluid extracted from the well 2 to be cooled as much as possible.

An insulating material 17 is, for example, arranged in the annular space 7, as will be described later with reference to FIG. 3. This insulating material 17 may be chosen to have an insulation capacity that varies according to the gas pressure inside the annular space 7. Such a material is, for example, a micro-porous material.

The annular space may also be left empty, as seen in FIG. 1.

The annular space 7 may also be filled with an aerogel, nanogel, rockwool, a material sold under the trademark Izoflex®, or open-pored polyurethane or any other material or combination of open-pored materials compatible with the maximal temperature. When the temperature regulating fluid is a gaseous one, the material will namely be chosen to allow a maximal variation in its insulating capacity in relation to the admissible pressure variation in the annular space, for example a variation in the conductivity at a ratio of 1 to 10, or even 1 to 30 for a pressure variation of 10 mbar to 100 bar.

The fluid extracted from the ground, leaving the device 1 according to the invention, is then transported by a pipe 14 positioned on the seabed, then by a pipe 38 to bring the extracted fluid up to a production facility 16. Pipe 14 may be a classical pipe that is not subject to the fabrication requirements for pipes that must withstand high temperatures. Pipe 14 on the seabed is, for example, of a length of several tens of kilometers. The fluid 1 leaving the device 1 arranged at the wellhead 2 could also be brought directly by a pipe 38 up to the production facility 16.

The temperature regulating fluid injected into the annular space of the transport device 1 could also be stored in a tank provided for this purpose in an extremity structure 112 or 113 of the transport device 1 by means of the pump, which will in this case also be installed in an extremity structure 112 or 113.

Figure 4:
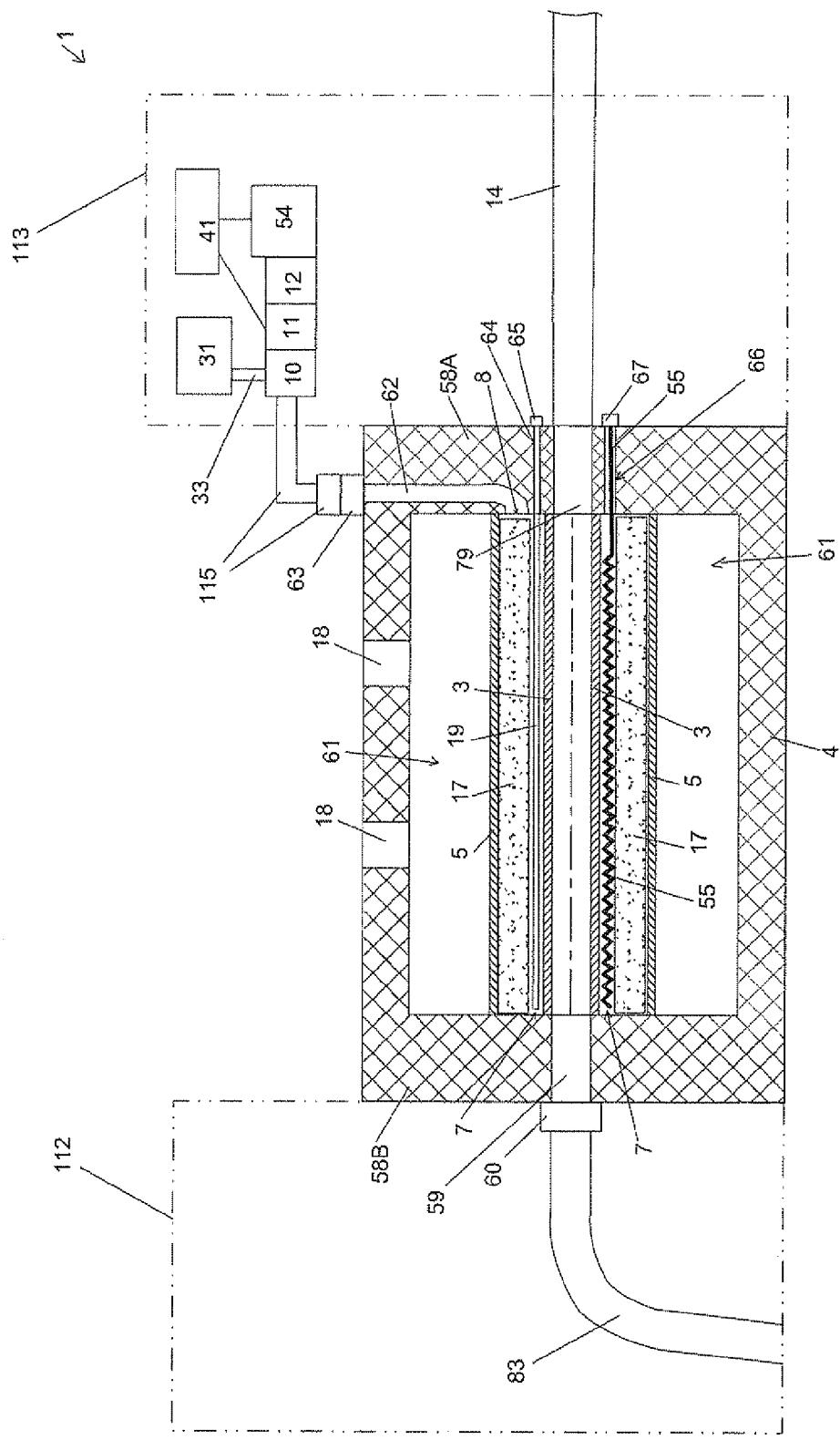
FIG. 4 shows a longitudinal section of a transport device according to the invention.

The transport device 1 namely incorporates a head 112 positioned at the inlet to the transport device 1 and an extremity structure 113 arranged at the outlet to which pipe 14 is attached. These extremity structures 112 and 113 are shown in FIG. 4, but such extremity structures are not shown in all the drawings for the sake of clarity.

The production facility 16 is, for example, arranged on a platform 15 emerging at the surface and supported by a support structure 13. The support structure 13 rests, for example, on the seabed 53, but a floating structure may also be envisaged.

Pipes 14 and 38 downstream of the device 1 according to the invention may be of any type required by the installation, such as, for example, a single pipe or pipe-in-pipe, flexible pipe or other type of pipe.

FIG. 2 schematically shows a fall in pressure and temperature of the extracted hydrocarbons, as a function of the duration of the exploitation E49, when the well is being exploited. Thus, a greater or lesser need to evacuate the heat Q48 occurs. The need to evacuate the heat Q48 drops, for example, by one half after two years of exploitation E49. A higher hydrocarbon temperature requires, for example, greater heat evacuation Q48. Higher hydrocarbon pressure at the same temperature also produces, for example, a greater quantity of heat Q48.

When the exploitation is suspended for a determined duration, a production stoppage thus requires the temperature to be maintained by heating as well as the need to minimize the dissipated heat namely by activating a drop in gaseous pressure in the annular space 7.

When production is started up once again, the heating is, for example, halted and the heat dissipation increased, for example, by increasing the gas pressure in the annular space.

Cooling or heating may thus be required.

As shown in FIG. 3, a temperature sensor 19 is arranged in the annular space. The temperature sensor 19 comprises, for example, an optical fiber arranged along the first pipe 3. The annular space is occupied by solid insulating material 17 of a shape that corresponds to that of the annular space. Housing is arranged, for example, in the insulating material 17 filling the annular space, for the sensor 19. The annular space also comprises electrically insulated electrical heating wires 55 arranged against the first pipe 3. The temperature piloting system comprises a control module to electrically power the electrical heating wires 55. Spaces are arranged, for example, in the insulating material 17 to install the electrical heating wires 55.

An insulating material could be provided that is flexible enough for the wires and the optical fiber to embed themselves in the material.

FIG. 3 shows, in a non-limitative way, additional ducts or cables 56 arranged in the external protective casing 4. These additional ducts or cables 56 may have various functions known by one skilled in the art for the control of the hydraulic or electric elements of the different elements installed in the extremity structure 112 at the inlet to the transport device 1. Embodiments comprising ducts in which a liquid for the temperature regulation flows will be described hereafter. The external protective casing 4 offers the advantage of being able to carry various complementary elements of equipment on board.

The holding elements 6 may be arranged radially, the pipe-in-pipe being centered in the external protective casing 4. The water filling the unoccupied space 61 in the external protective casing 4 and in contact with the pipe-in-pipe, enables heat to be conducted from the pipe-in-pipe or even triple-walled pipe in a controlled and easily modeled manner. This advantage is explained in further detail hereafter. Examples of triple-walled pipe will be described later.

FIG. 3 shows the movable elements 57 of the seabed 53 lying on either side of the external casing 4. Advantageously, the external casing 4 has a large enough diameter to avoid the necessity of trenching. Its diameter is, for example, of between 100 and 200 cm. This determined diameter of the external casing 4 also enables a large enough heat exchange surface to be maintained despite the possible deposits 57 and fouling material on either side of the casing 4.

Contrary to the devices of prior art, the present transport device can withstand internal or external deposits namely because of its great length.

According to prior art, the positioning of a bare portion of non-insulated pipe at the well outlet namely constitutes a solution that is very sensitive to internal or external deposits that considerably modifies its efficiency and it is thus difficult to imagine such a solution exempt from a substantial margin of uncertainty with regard to the heat exchanges. Moreover, since this solution functions in a go-no go manner it cannot adapt to any variations in flow in the pipe.

Still according to prior art, when a pipe is trenched, the heat exchanges cannot be precisely regulated.

In the present invention, the large diameter, for example more than 100 cm, of the external casing 4 always enables a heat exchange surface to be maintained with the subsea environment. Thus, the environment of the pipe-in-pipe and its characteristics with respect to the heat exchanges are determined, since the geometry around the pipe-in-pipe is controlled. A calculated estimation of the heat exchanges enables us to determine that the configuration according to the invention, with a pipe of 100 cm in diameter, allows the evacuation of heat to be obtained at a rate of more than 1 kW/m when the difference in temperature is of 10° C. between the inside and the outside of the external protective casing 4. Such a transport device of a length of several kilometers is thus able to evacuate several MW.

Dimensioning is performed, for example, according to the heat exchange capacities inside the protective casing 4.

FIG. 4 is a section of one embodiment of the device 1 that comprises an optical fiber 19 arranged all along the first pipe 3. Heating wires 55 are, for example, also arranged along the first pipe. The first pipe 3 may thus be heated along its full length. An insulating material 17 occupies the annular space. The temperature of the first pipe 3 assembly may thus be controlled.

The external protective casing 4 is shown as a longitudinal section. The welds of plates 58A and 58B arranged at the two ends of the casing 4 are not shown.

The pipe-in-pipe is inserted into the external casing 4 then the end plates 58A and 58B are added to close up this casing 4. The external casing 4 has a circular section, for example, centered on and around the pipe-in-pipe. The openings 18 in the external casing 4 enable the transport device 1 to be immersed after being towed midwater by boat above the well outlet 2. The unoccupied space 61 in the protective casing 4 is then filled with water.

A pipe 59, arranged in a first plate 58B, communicates with the pipe 83 at the well 2 outlet. This pipe 59 communicates, for example, with a connecting element 60 at the well outlet. The extremity structure 112 positioned at the inlet, enables for example the arrangement of the connecting elements.

The interior of the first pipe 3 communicates, for example, with a pipe 79 arranged in the second plate 58A intended to be connected to an outlet pipe 14. Connecting and attachment elements are, for example, provided in the extremity structure 113 positioned at the outlet of the transport device 1.

A duct 62, arranged in the second plate 58A, communicates via orifice 8 with the annular space 7. This duct 62 opens, for example, radially to the outside of the protective casing 4. A connecting element 63 for this duct 62 is provided to the exterior of the transport device 1.

The pump 10 is, for example, arranged in the extremity structure 113 at the outlet, as is a power source 41 and gas tank 31. The tank 31, communicating with the pump 10 via a duct 33, is, for example, filled by a suction or emptied when gas is injected into the annular space 7. The pump 10 is automatically controlled by a power element 11, itself piloted by an electronic interface 12. A management module 54 sends, for example, control signals to this interface 12 according to a memorized computer program executed by this module. The pump 10 is linked to a connecting element 115 connected to a connecting element 63 linked to the annular space 7.

For the sake of clarity, the other communication links with the management module 54 are not shown.

A channel 64 closed by an element 65 is arranged in parallel to the longitudinal axis of the device 1 for the connection to the optical fiber 19. The connecting element linked to the optical fiber 19 is positioned on an external face of the plate 58A and is, for example, arranged in the extremity structure 113 outlet.

A channel 66 closed by an element 67 is positioned in parallel to the longitudinal axis of the transport device 1 for the connection to the heating wires 55. The connecting element 67 linked to the electrical heating wires 55 is placed on an external face of plate 58A and is, for example, arranged in the extremity structure 113 at the outlet. For the sake of clarity, module 86 controlling power module 39 and the links with management module 54 and the power source 41 are not shown.

The optical fiber 19 and heating wires 55 could also be connected via the duct 62 that serves to regulate the gas pressure.

Other ducts may be arranged so as to introduce other control or inspection means. Other embodiments of the transport device 1 positioned at the wellhead will be described hereafter.

Figure 5:
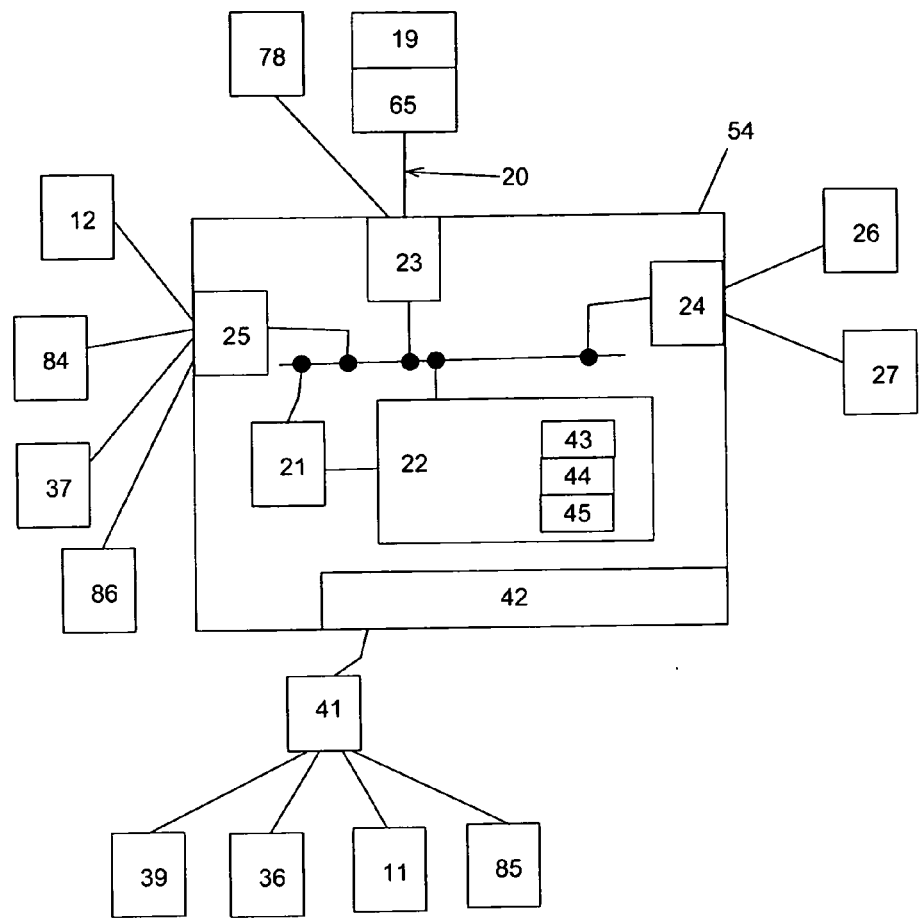
FIG. 5 shows a diagram of a temperature piloting system.

As schematized in FIG. 5, which shows a detailed drawing of the piloting system, the temperature sensor 19 transmits, via a communication link 20 and the linking 65, a signal representative of the temperature of the fluid leaving the extraction well 2, to the management system 54.

The management system 54 comprises a calculator 21 piloting a memory component 22 by a control bus. A data bus, for example, enables data to be exchanged between the calculator 21, the memory 22 and different components. The management system 54 is, for example, made by an automaton, a computer or an embedded electronic system.

The calculator 21 and the memory 22 communicate, for example, with the input and output ports 25 communicating with actuator control modules 12, 84, 37 and 86.

The calculator 21 and the memory 22 communicate, for example, with input and output ports 23 communicating with sensors 19 and 78.

The calculator 21 and the memory 22 communicate, for example, with an input and output port 24 communicating with a control and monitoring interface. The control and monitoring interface comprises, for example, a keyboard 27 and control monitor 26, but this control and monitoring interface may also be a remotely-controlled interface.

An electrical power generator 41 is linked to a power supply management module 42 for the electronic components such as the calculator 21 or the memory 22. The electrical power supply generator 41 is linked to power modules 11 and 39 and to actuators 85 and 36. The electrical power generator 41 is, for example, a fuel-powered current generator. The generator 41 can deliver single or three phase alternating voltage or direct voltage.

Control modules 12, 84, 37 and 86 are piloted according to the signals transmitted by the sensors 19 and 78 and to the memorized program data. Threshold values 43, 44, 45 are, for example, stored in the memory, the calculator 21, for example, making a comparison between the acquired values and the threshold values.

Figure 6:
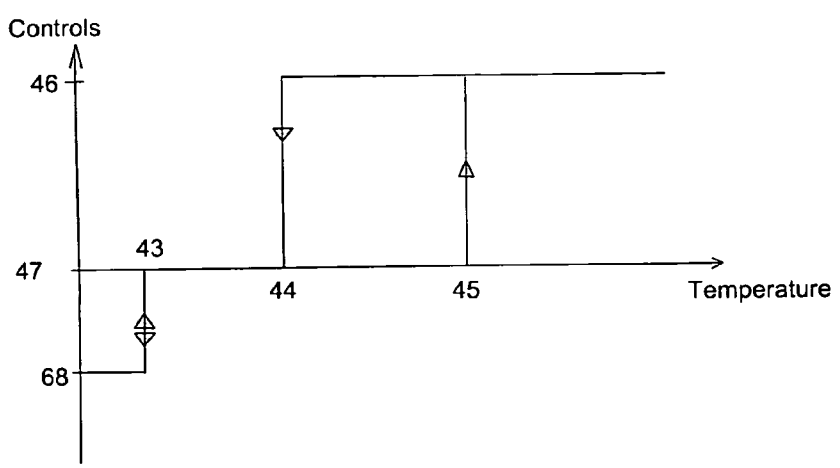
FIG. 6 shows a control diagram for the piloting of the temperature.

FIG. 6 illustrates one example of a simplified control for heat dissipation and heating. Above a determined temperature 45, a maximum dissipating control 46 is activated. If the measured temperature is lower than the determined temperature 44, a minimum dissipation control is activated. Since threshold temperature 44 is lower than threshold temperature 45, an order for temperature control by hysteresis is made. A determined temperature 43 is also shown, namely lower than temperature 44, below which a heating control 68 will be triggered.

This control scheme, which functions on a go-no go basis, may be performed by a program stored in the memory 22 and executed by the calculator 21. However, more sophisticated gradual control programs may be developed according to need. The control of heat dissipation or heating may namely be performed using a feedback loop.

Figure 7:
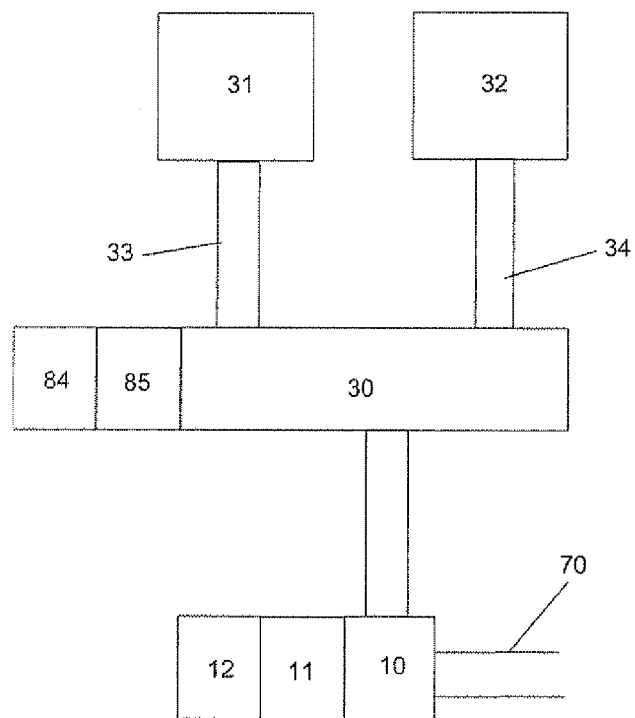
FIGS. 7 and 8 show layout diagrams for the control elements of the temperature piloting system.

FIG. 7 illustrates an arrangement around the activation element of the regulating system and which is, for example a pump 10 supplying an outlet duct linked to a valve 35 to close or open the duct 9 linked to the opening 8 communicating with the annular space 7. When this valve 35 is closed the gas pressure is maintained in the annular space, and when this valve 35 is open, the gas pressure may be increased or decreased by the action of the pump 10. Advantageously, by closing the valve 35, no additional energy is required to maintain the pressure of the temperature regulating gas. When the valve 35 hermetically closes the annular space 7, the pump 10 pressurizing the annular space may, in fact, be cut off.

The cut-off valve 35 is placed in the open or closed position by an actuator 36 piloted by a control module 37 that receives a control signal via the port 25. One skilled in the art will recognize that the number of these valves and control elements is frequently multiplied for subsea equipment so as to ensure the best possible reliability and protection against accidental water infiltration. This multiple equipment is not shown in the drawings, for the sake of clarity.

The pump 10 may be supplied by a valve 30 selecting the gas to be injected. This selection valve 30 is positioned by an actuator 85 piloted by a control module 84 that receives a control signal via port 25. A first position of this valve 30 corresponds to a supply from a duct 34 linked to a helium tank 32 (very conductive gas). A second position of this valve 30 corresponds to a supply from a duct 33 linked to an air tank 31 (less conductive gas) or an only slightly conductive gas such as xenon.

The pump is, for example, also linked to a release duct 70 when the suction is activated to reduce the gas pressure in the annular space. Release can be done into the open air or under the water, for example, in the case of a remotely-controlled vehicle. Release may also be made into a tank provided for this purpose.

A release and suction duct may also be envisaged to open out into the open air.

In a non-limitative way, the tanks 31 and 32, the power module 11 and the actuators 85 and 36 can be positioned on a surface platform or carried on board in a service vehicle or else positioned in the bundle extremity structures 112 and 113. The service vehicle may be a boat on the surface or a vehicle able to move underwater such as a remotely-controlled vehicle, also called a ROV (Remotely Operated Vehicle). A ROV will be further described hereafter.

The controlled gas pressure in the annular space 7 filled, in part, by a microporous material, allows for example the heat conductivity to be varied between an initial value of 3 and 10 mW/(m·K) for a pressure of 10 mbar and a high value which could reach approximately 80 mW/(m·K) for a pressure of 60 bar, when the injected gas is air. The heat exchanged with the environment (heat flux) is a measure of the quantity of heat passing through the thermal insulation per unit of timer it is proportional to the temperature differential between the hot side and the cold side and inversely proportional to the thickness of the insulation.

Replacing air with helium allows a conductivity of 6 to 20 mW/(m·K) for a pressure of 10 mbar and a conductivity of 150 to 200 mW/(m·K) for a pressure of 60 bar when the insulation is a macroporous insulation material constituted by the compression of pyrogenic silica and rutile particles. Such a material is namely manufactured under the trademark Izoflex® by Microtherm.

Figure 8:
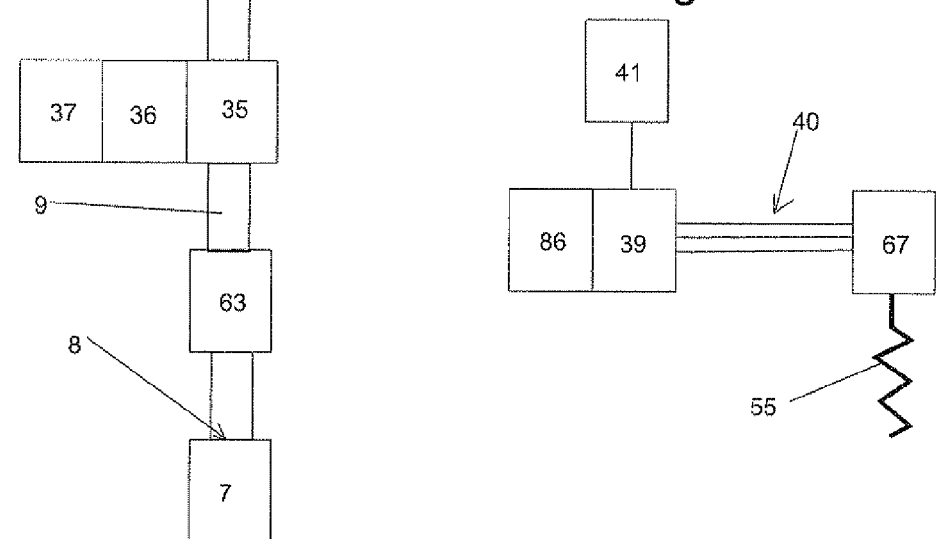

As shown in FIG. 8, heating by electrical heating wires is, for example, controlled by a piloting module 86 comprising a power module 39 to which the electrical heating wires 55 inside the annular space 7 are electrically connected via a conductor cable 40. The conductor cable 40 supplies the connecting element 67 to which the heating wires 55 are connected. The power module 39, for example, receives electrical energy via the power source 41.

Figure 9:
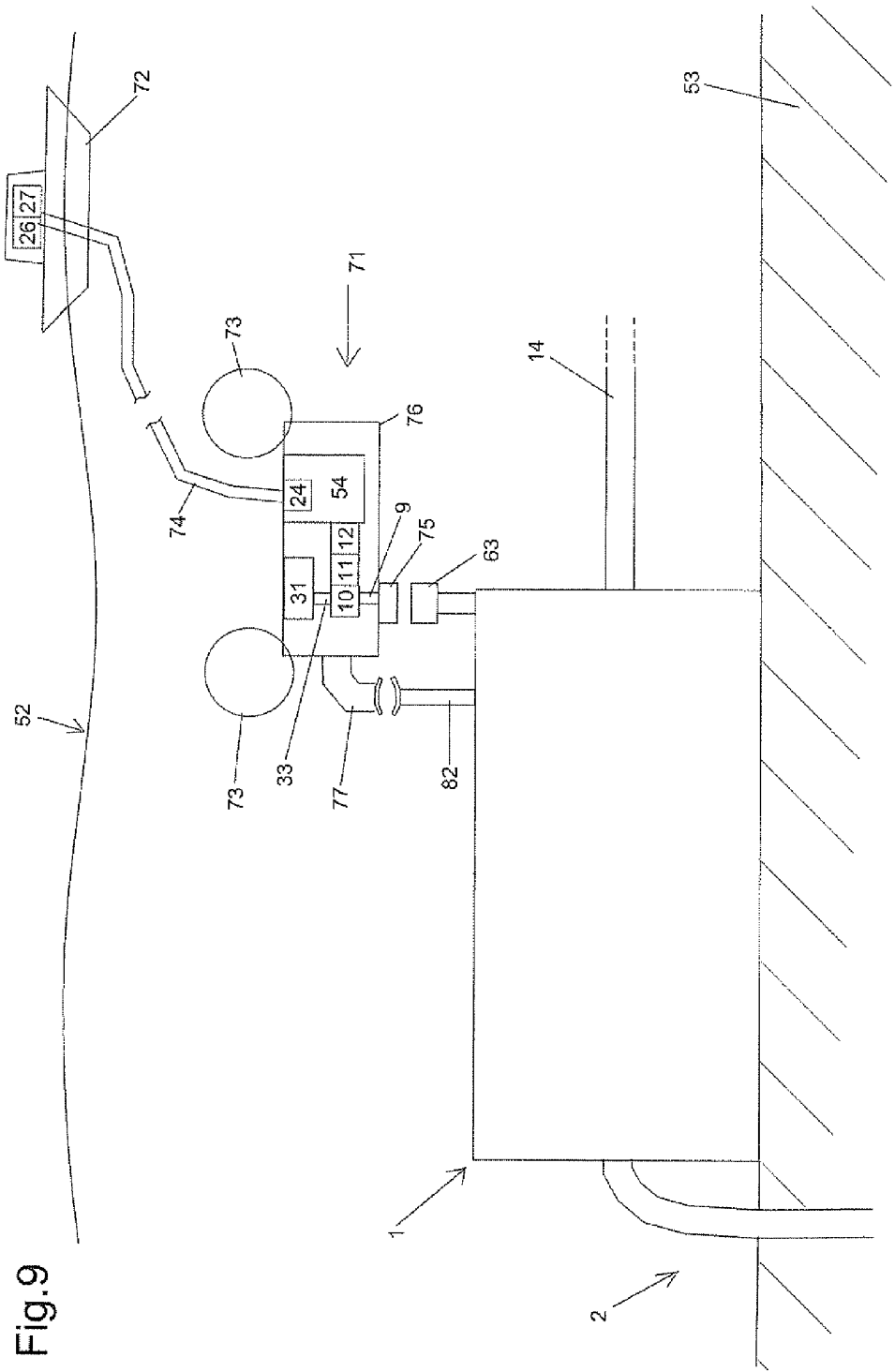
FIG. 9 shows a remote-controlled vehicle arriving to perform a gas pressure control in the annular space according to the temperature to be piloted.

FIG. 9 shows a remotely-operated immersed vehicle 71 namely enabling the control of the heat dissipation by adjusting the gas pressure in the annular space 7. A surface service vessel 72 comprises an interface 26 and 27 to control the remotely-operated vehicle 71 which itself also comprises a piloting interface 24. In a non-limitative way, the remotely-operated vehicle 71 carries on board its own power source or is powered by the service vessel 72. A line of communication 74 is shown between the service vessel 72 and the remotely-operated vehicle 71, but telecommunication means by waves may also be used.

In order to simplify the drawing, only one compressed air tank 31 to supply the pump 10 is shown. Once again, for the sake of simplicity, the different sensors such as a pressure sensor or certain actuators are not shown.

The remotely-operated vehicle 71 comprises a cabin 76 onto which the mobility and orientation elements 73 are placed.

The remotely-operated vehicle 71 namely comprises a connecting element 75 for connection to the annular space, protruding with respect to the cabin 76. This connecting element 75 is connected to the connecting element 63 of the transport device 1 arranged at the wellhead to enable communication with the annular space 7 via the opening 8.

The remotely-operated vehicle 71 namely comprises a hooking and positioning element 77 that protrudes with respect to the cabin 76.

The hooking and positioning element 77 is intended to hook onto the external protective casing 4. This may be performed on a hook 82 arranged at a determined place so as to correctly position the remotely-operated vehicle 71. The hook 82 may also allow the remotely-operated vehicle to be attached to the transport device 1 arranged at the wellhead.

Once the connecting element 75 for connection with the annular space has been connected to the element 63 communicating with the annular space 7, gas may be drawn in or out by the suction opening 8 through the action of the pump 10. Connecting and disconnecting the connecting element 75 for connection with the annular space in respect to the element 63 communicating with the annular space 7 is made hermetically. The outlet duct 9 of the pump can also be pressurized before the link is made with the element 63 communicating with the annular space 7. A locking and unlocking actuator, controlled by the management module 54, can namely be integrated into the connecting element 75 for linking with the annular space to connect or disconnect it.

Variant embodiments will now be described with reference to FIGS. 10, 11, 12, 13 and 14 for which the regulating fluid in the annular space 7 between the first and second pipes is a liquid. Injecting of the liquid at one end of the annular space combined with an evacuation or suction of the liquid at another end of the annular space allows the temperature control liquid to circulate, this liquid thus transporting the excess heat which needs to be evacuated.

Figure 10:
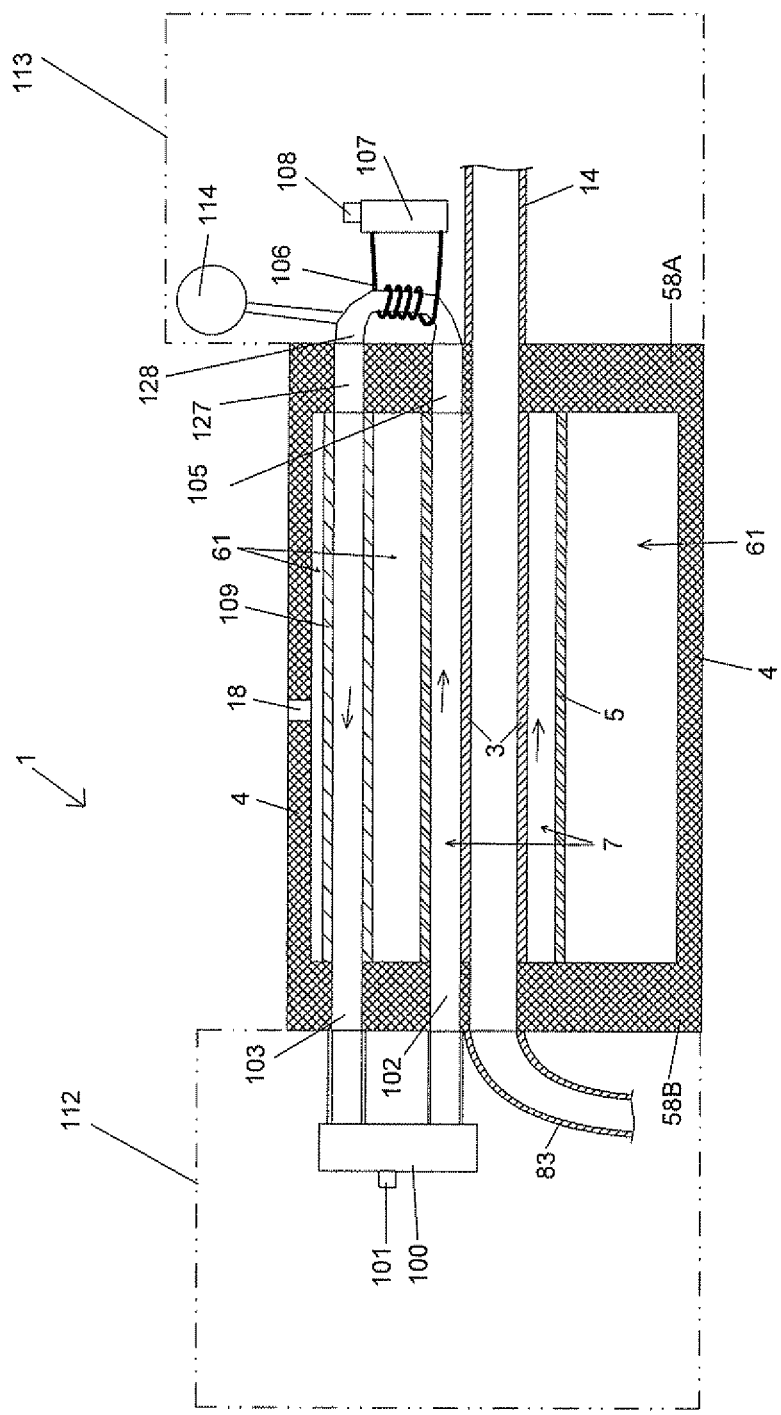
FIGS. 10 and 11 show longitudinal sections of embodiments of transport devices according to the invention.

FIG. 10 shows one embodiment of the transport device 1 arranged at the wellhead in which the annular space 7 between the first pipe 3 and the second pipe 5 comprises a temperature control liquid. This liquid may be in movement so as to increase the heat exchanges between the first pipe 3 and the medium 61 filling the external protective casing 4, by transporting this heat through its movement. A pump 100 controlled by a control interface 101 arranged to the exterior of the protective casing 4 controls the movement or stopping of the temperature regulating fluid in the annular space 7. The pump 100 is, for example, installed in an extremity structure 112.

The pump 100 is linked by a duct 102 made in a plate at one end of the annular space 7. This annular space 7 communicates at its other end with a duct 105 made in a plate arranged at the end of the external protective casing 4.

Figure 11:
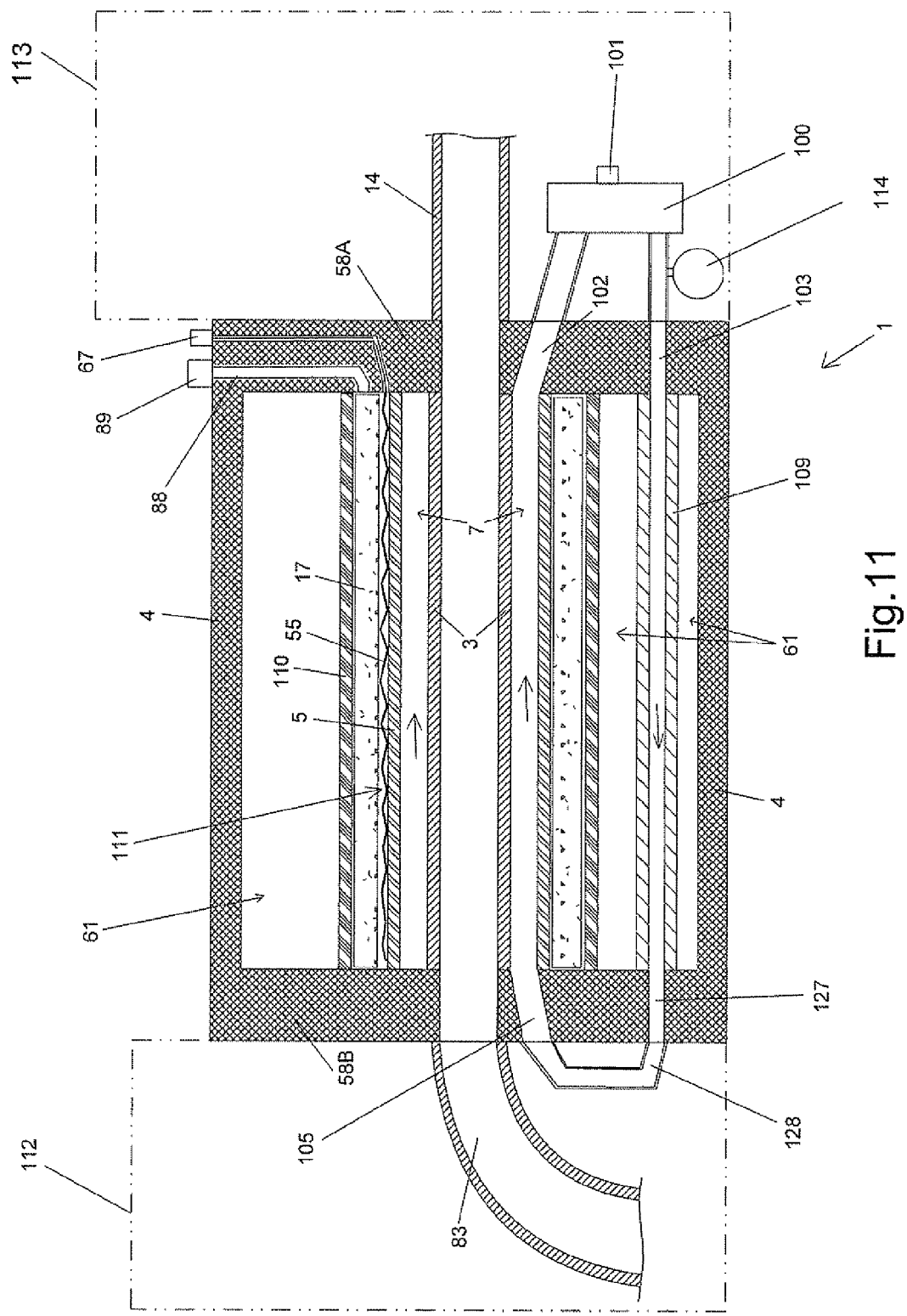
Figure 14:
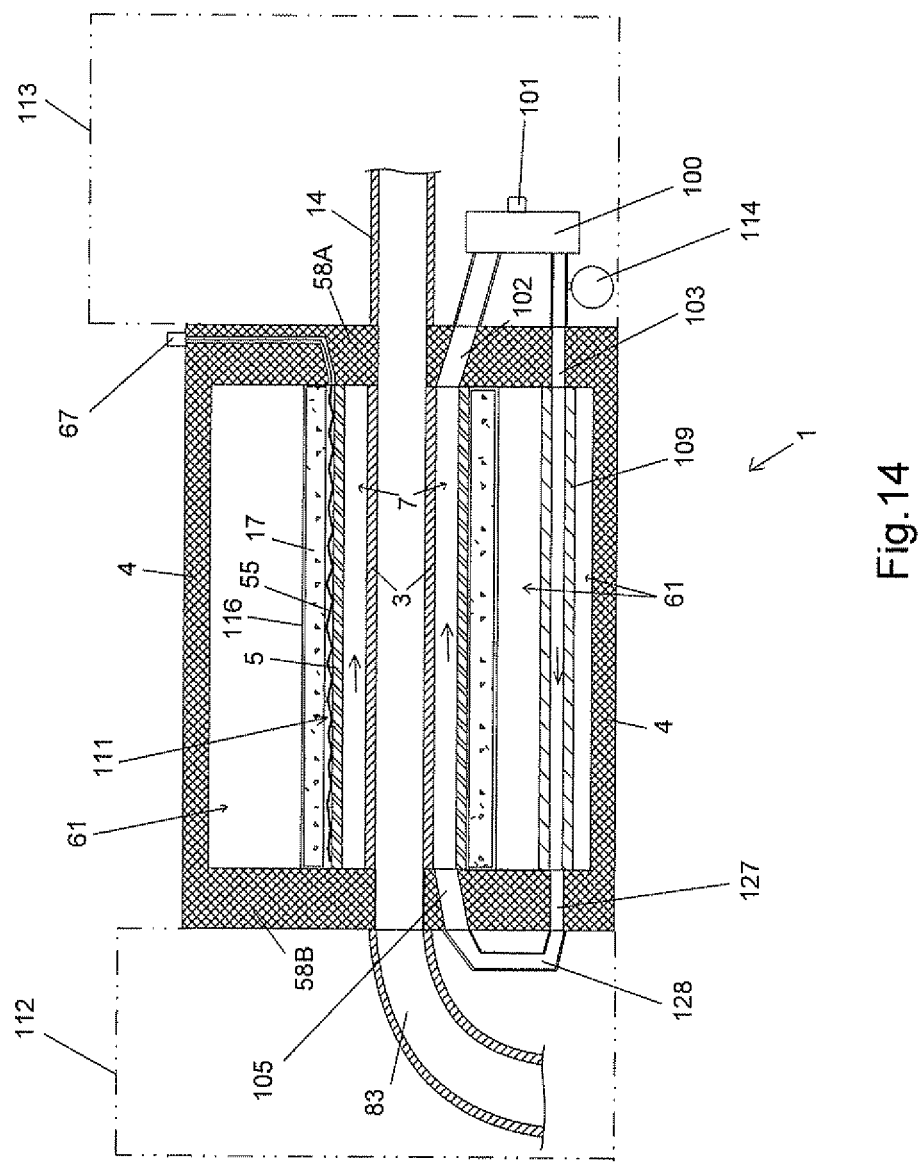

The temperature regulating fluid circulates in a closed circuit, as shown in FIGS. 10, 11 and 14.

A closed circuit for the circulation of the temperature regulating fluid comprises, for example, a metallic duct 109 passing through the medium 61 filling the external protective casing 4. This duct 109 links with the duct 127 connecting the annular space 7 via an external duct 128. Duct 109 is furthermore linked to a duct 103 connecting the pump 100 used to circulate the regulating fluid.

The pump 100 activated by the interface 101 makes the regulating fluid circulate in the closed circuit. The pump 100, stopped by means of the interface 101, stops the circulation of the regulating fluid.

The temperature regulating fluid is cooled when it passes in the non-insulated duct 109 which passes through the medium 61 filling the protective casing 4.

The fluid may also be heated, for example when it passes in duct 128 that allows the annular space 7 to communicate with the duct 109 linked to the pump 100, as shown in FIG. 10. The heating may be performed by a coil 106 arranged around the duct 128. The coil 106 is heated by a power element 107 control by an interface component 108. Namely, an expansion tank 114 is provided, linked to the temperature control liquid circuit. Thus, activating the pump enables cooling or the pump may be combined with separate heating means.

The interface components 108 and 101 are, for example, piloted via communication lines, by the management module 54.

As shown in FIG. 11, it is also possible for electrical heating wires 55 to be provided along the second pipe 5. An expansion tank 114 linked to the temperature control liquid circuit is also provided in this case.

The second pipe 5 may be non-insulated, as shown in FIG. 10, or insulated, as shown in FIG. 11.

An insulating material 17 may be held around the second pipe 5 by straps or a protective film 116, this embodiment being shown in FIG. 14.

It is also possible for the insulating material to be placed in a third pipe 110 arranged around the second pipe 5 so as to form a second annular space 111. As shown in FIG. 11, a gas in this second annular space 111 can be pressure controlled so as to increase or reduce the heat exchanges between the second pipe and the medium 61 filling the external protective casing 4. This pressure control is performed as described previously by means of a duct 88 communicating with this second annular space 111. A connecting element 89 for the second annular space 111 is arranged to the exterior of the external protective casing 4.

Figure 13:
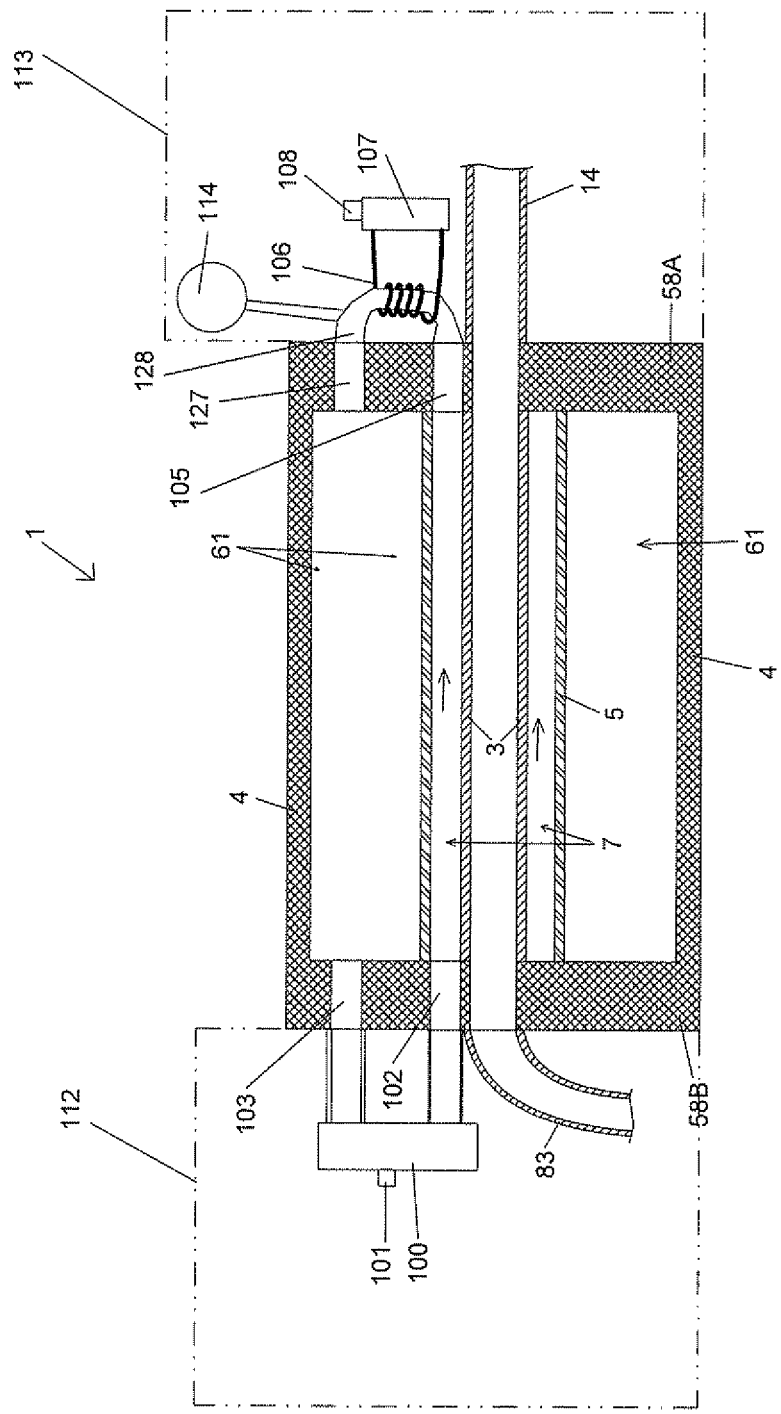
FIGS. 13, 14 and 15 show variant embodiments of transport devices according to the invention.

In a variant embodiment of the embodiment represented at FIG. 10, the duct 109 may also be eliminated. Such an embodiment is represented at FIG. 13. The liquid circulates, in this case, by passing through the annular space 7 then through the space 61 inside the external protective casing 4 before returning to the annular space 7. In such a variant, the openings 18 may, for example, be closed after the medium 61 has been filled with seawater.

The circulation of the temperature control liquid improves the heat exchanges whereas the stopping of the circulation of this liquid improves heat insulation.

Figure 12:
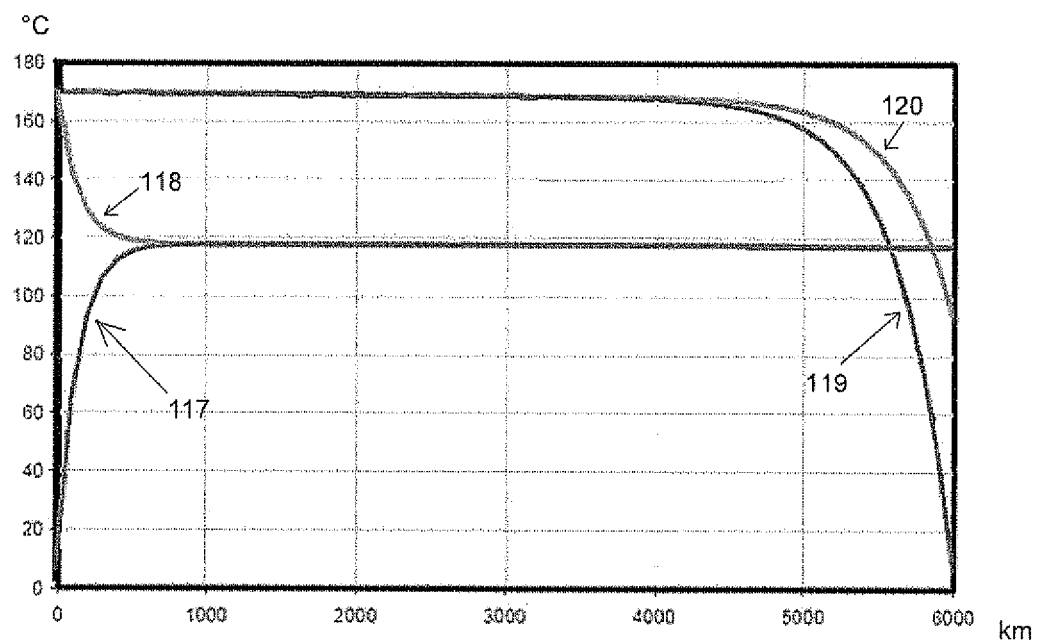
FIG. 12 shows temperature curves for the effluents in a classical pipe cooled by a liquid.

FIG. 12 shows effluent temperature curves in a liquid-cooled pipe so as to illustrate the effect of co-current or counter-current cooling.

The circulations of the temperature control liquids are shown, in a non-limitative way, co-current in FIGS. 10, 11, and 14. The temperature control liquids may circulate counter-current or co-current according to need.

As shown in FIG. 12, the temperature 117 of the water circulating co-current lowers the temperature 118 of the oil after less than 1000 meters of pipe and keeps a lowered temperature over the full remaining length of the transport device 1.

The temperature 119 of the water circulating counter-current lowers the temperature 120 of the oil over the last 1000 meters of the pipe. However the temperature of the water very rapidly matches the temperature corresponding to the temperature of the oil at the well outlet.

The total length of 6000 m, shown in FIG. 12, is not limitative and only illustrates the temperature stabilization for a cooling circuit using a cooling liquid circulating co-current or counter-current.

According to need, one or other direction of circulation of the temperature control liquid can be used in the present invention.

In the present invention, the heat may advantageously be evacuated all along the second pipe 5 of the transport device 1, the temperature control liquid being able to be cooled thanks to the medium 61 which enables the heat to be evacuated.

Figure 15:
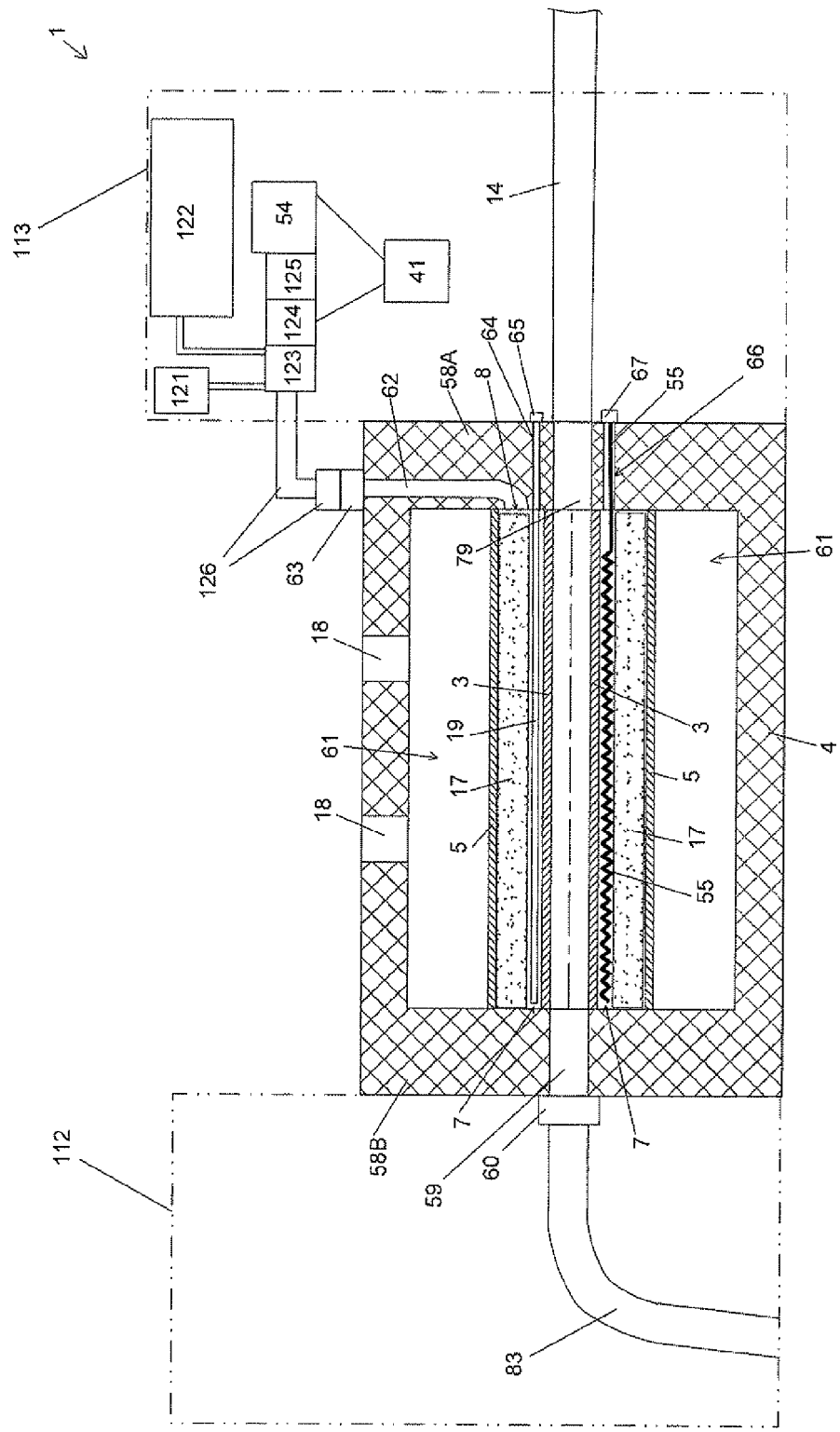

Another variant embodiment will now be described. As shown in FIG. 15, the hydrocarbon transport device 1 intended to be immersed and arranged at the head of an extraction well 2 comprises, as previously described, a first pipe 3 in which flows a first fluid leaving the extraction well 2. The first pipe is arranged in an external protective casing 4 filled by the liquid medium when the device 1 is immersed and installed at the wellhead. The regulating system comprises a second pipe 5 arranged around the first pipe 3 and delimiting an annular space 7 enclosing a temperature regulating fluid and an insulating material 17. The insulating capacity of the insulating material 17 varies according to the pressure in the annular space. In this embodiment, the activation element of the temperature regulating system is the valve 123 and the temperature regulating fluid is a gas. Gas is injected into or pumped out of the annular space 7 according to the position of the activation valve 123 of the regulating system.

The piloting system of the hydrocarbon temperature in the first pipe comprises a pressurized air tank 121 and a tank 122 constituting a vacuum tank. The vacuum may namely be obtained by pumping. The tank 122 will be of a determined volume in which the vacuum will be made. In this way, gas may be pumped out of the annular space 7 by making this vacuum tank 122 communicate with the annular space 7.

The activation element 123 is a valve with several positions including a position in which the vacuum tank 122 is in communication with the annular space 7, a position in which the annular space 7 is in communication with the pressurized gas tank 121 and a position in which the annular space 7 is closed. In a non-limitative way, air is used but other gases may be used. The valve 123 is linked by a connecting element 126 to the connecting element 63 linked to the annular space 7.

This valve 123 is moved, for example, by a motor 124 powered by a power supply 41 and piloted by an electronic control interface 125. The electronic control interface 125 receives control signals from the management module 54. In a non-limitative way, tanks 121 and 125 as well as the actuators, the activation element of the temperature regulating system and the management module 54 are arranged in the extremity structure.

The efficiency of the heat exchanges along the pipe 3 can cause the thermal balances between the regulating fluid and the hydrocarbons to be made over a few kilometers at most in the first place, after the installation of the transport device 1. The installation of a transport device 1 of greater length namely enables a robust solution to be proposed to the problem of the internal or external fouling by internal or external deposits by allowing the heat exchanges to be performed over longer distances.

It is obvious for one skilled in the art that the present invention allows for different embodiments. Consequently, the present embodiments must be considered as illustrating the invention defined by the enclosed claims.

What is claimed is:

1. A hydrocarbon transport device intended to be immersed and arranged at the head of an extraction well, comprising a first pipe through which a first fluid leaving the extraction well flows, the first pipe being arranged in an external protective casing which is, furthermore, filled with a liquid medium when the device is immersed and installed at the head of the well, further comprising a piloting system to pilot the temperature of the hydrocarbons circulating in the first pipe, that controls at least one activation element of a regulating system to regulate heat exchange between the first pipe and the liquid medium filling the external casing, the regulating system comprising at least a second pipe arranged around the first pipe delimiting an annular space enclosing at least one regulating fluid, this regulating fluid being injected into or expelled from the annular space by the activation element of the regulating system.

2. A transport device according to claim 1, further comprising a heating system for heating the first pipe, the heating system being controlled, activated or deactivated by the piloting system.

3. A transport device according to claim 2, wherein the piloting system controls an activation of the heating system while the regulating system controls a reduction of the heat exchanges.

4. A transport device according to claim 2, wherein the piloting system controls a deactivation of the heating system while the regulating system controls an increase of the heat exchanges.

5. A transport device according to claim 2, further comprising at least one temperature sensor transmitting, via a communication link, a signal representative of the temperature of the fluid coming out of the extraction well, to the piloting system, a calculator of the piloting system making at least one comparison with a memorized threshold value, according to which heating or cooling is ordered by the piloting system.

6. A transport device according to claim 5, wherein the temperature sensor comprises at least one optical fiber arranged in the annular space delimited between the first and second pipes and along the first pipe.

7. A transport device according to claim 1, wherein an insulating material is arranged in the annular space between the first and second pipes, the regulating fluid being gaseous, the regulating system comprising a gas transport duct leading to an orifice of the closed annular space arranged between the first and second pipes, the suction of gas in or out of this annular space being activated by said activation element, the insulating material having a variable insulating capacity depending on the pressure inside the annular space, the thermal conductivity of the insulating material expressed in $W/(m \cdot K)$ being able to vary by a factor of at least 3 between 10 mbar and 1 bar and by a factor of at least 4 between 1 bar and 60 bar.

8. A transport device according to claim 7, wherein the piloting system comprises in addition a control module for controlling a supply selection valve for selecting a type of gas to be injected.

9. A transport device according to claim 8, wherein the selection valve controls the supply to said activation element by a supply pipe transporting a first gas, such as air or xenon, or by a second supply pipe transporting a second gas, such as helium.

10. A transport device according to claim 1, wherein said activation element comprises a pump to create a vacuum by suction or said activation element comprises a valve communicating with a vacuum tank to create a vacuum.

11. A transport device according to claim 1, wherein the piloting system comprises a control interface arranged on surface service equipment, the piloting system comprising, in addition, an immersed vehicle remotely controlled by the control interface and powered, the vehicle comprising mobility and orientation equipment and being equipped with a linking element to link it to a connecting element in communication with the annular space delimited between the first and second pipes, the immersed vehicle being equipped with a positioning element for a positioning with respect to the external protective casing.

12. A transport device according to claim 11, wherein said activation element of the regulating system is embedded in the vehicle, the vehicle comprising at least one gas tank communicating, via said activation element, with the linking element.

13. A transport device according to claim 1, wherein the piloting system comprises a control interface arranged on surface service equipment, the piloting system comprising, in addition, an embedded module integrated into an extremity structure at the inlet or outlet to the transport device, the embedded module being able to be controlled remotely by the control interface and being powered, the embedded module comprising a linking element to link it to a connecting element in communication with the annular space delimited between the first and second pipes, the embedded module being equipped with said activation element of the regulating system and comprising at least one gas tank communicating, via said activation element, with the linking element.

14. A transport device according to claim 1, wherein said activation element being a pump, the regulating fluid is in the form of a cooling liquid circulating in the annular space under the action of the pump and moving from an inlet orifice to an outlet orifice to then move into the medium filling the external casing.

15. A transport device according to claim 14, wherein the regulating system comprises a closed circuit made by at least one duct passing inside the external casing via which said outlet orifice communicates with said inlet orifice.

16. A transport device according to claim 14, wherein the regulating system comprises a thermally insulating material arranged around the second pipe.

17. A transport device according to claim 16, further comprising a third pipe arranged around and at a distance from the second pipe, forming another additional annular space in which said thermally insulating material is placed, the regulating system controlling a pressure inside the annular space between the second and third pipes by a suction of gas in or out of this closed annular space that is provided with a communication orifice that communicates with a mechanism to inject gas in or expel it.

18. A transport device according to claim 1, wherein said transport device is of the type that is built on land and forms a single assembly several kilometers long, this assembly being made so as to be towed out to sea before being immersed during its installation.

19. A transport device according to claim 3, wherein the piloting system controls a deactivation of the heating system while the regulating system controls an increase of the heat exchanges.

* * * * *